United States Patent [19]
Struthers

[11] 4,352,864
[45] Oct. 5, 1982

[54] METAL/ACID ION PERMEABLE MEMBRANE FUEL CELL

[75] Inventor: Ralph C. Struthers, Saugus, Calif.

[73] Assignee: Universal Fuel Systems, Inc., Saugus, Calif.

[21] Appl. No.: 251,488

[22] Filed: Apr. 6, 1981

[51] Int. Cl.³ .......................................... H01M 8/24
[52] U.S. Cl. ...................................... 429/18; 429/14; 429/40; 429/46; 429/101
[58] Field of Search .............. 429/18, 14, 17, 19, 429/34, 40, 46, 101

[56] References Cited
U.S. PATENT DOCUMENTS

| | | | |
|---|---|---|---|
| 3,806,370 | 4/1974 | Nischik | 429/18 |
| 4,159,366 | 6/1979 | Thaller | 429/19 X |
| 4,311,771 | 1/1982 | Walther | 429/14 X |

Primary Examiner—Charles F. LeFevour

[57] ABSTRACT

A fuel cell which comprises a metal anode immersed in a base electrolyte solution and connected with an electric circuit, a cathode comprising an acid solution, a carbon catalyst and electron distributor plate in that solution and connected with an electron supply and a wettable fluid impermeable membrane and disposed between the electrolyte and cathode solution and establishing an acid-base reactor interface where hydroxyl ions are generated for conduction through the electrolyte to the anode.

14 Claims, 3 Drawing Figures

METAL/ACID ION PERMEABLE MEMBRANE FUEL CELL

This invention has to do with a fuel cell and is particularly concerned with a fuel cell in which a metal anode plate is immersed in an alkaline electrolyte solution, the cathode is an acid compound solution, and wherein the electrolyte and cathode solutions are separated by a liquid barrier ion permeable membrane.

BACKGROUND OF THE INVENTION

In the art of fuel cells, it has long been common practice to employ liquid electrolytes of suitable base or acid materials in aqueous solution. Such electrolytes are arranged or disposed between and in contact with anode and cathode electrodes of the fuel cells. In such cells, the electrolytes function to conduct hydroxyl ions generated by chemical reaction at the cathode electrodes to the anode electrodes. The electrodes are commonly established of structurally stable fuel metals or alloys which can be self-supported in the electrolytes without disintegrating or going into solution.

In theory, it is apparent that one or both of the electrodes of a fuel cell could be established of suitable metals or fuel elements in aqueous solution or other liquid form. Putting that theory into practice has been avoided and considered impractical since if an electrode of a cell was in liquid form, it would commingle with the liquid electrolyte and the resulting cell would be rendered inoperative.

OBJECTS AND FEATURES OF THE INVENTION

It is an object and feature of my invention to provide a novel fuel cell structure comprising an elongate container with a pair of longitudinally spaced liquid barrier ion permeable membranes dividing the interior of the container into three compartments, there being cathode compartments at the opposite ends of the container and a central anode compartment between the cathode compartments.

Another object and feature of my invention is to provide a fuel cell structure of the character referred to above wherein a flat anode plate of metal fuel is positioned in the anode compartment and has oppositely disposed flat surfaces spaced from and opposing the membranes.

Yet another object and feature of my invention is to provide a cell structure of the character referred to above which includes a base electrolyte solution in the anode compartment, electron distributor plates in the cathode compartments and an acid cathode fuel solution in the cathode compartment.

Still another object and feature of my invention is to provide a cell structure of the general character referred to with related means to conduct electrolyte and cathode solutions into and out of their related cell compartments and which works on the electrolyte to remove that undesirable by-product of chemical reaction which forms in the electrolyte within the anode compartments and which would render the cell structures inoperative, if not removed.

Another object and feature of the invention is to provide liquid barrier ion permeable membranes in a cell structure of the character referred to above, which membranes are composed of sulfonic acid polymers, and/or polysulfone, and/or fluoropolymers which all withstand highly corrosive conditions and may be used with acids and bases.

Still another object and feature of my invention is to provide membranes of the character referred to above which serves as a wettable, ionically conductive, acid and base reactor barrier.

Another object and feature of the invention is to provide a fuel cell liquid barrier of the character referred to above which has an acid and base reactor interface.

Another object and feature of the invention is to provide porous membranes of the character referred to wherein the pores thereof are plugged with gel-like coagulates.

Yet another object and feature of the invention is to provide a barrier of the character referred to above which cooperates with the solutions to establish the cathode electrode for the cell structure.

The foregoing and other objects and features of my invention will be fully understood from the following description of the invention, throughout which description reference is made to the accompanying drawings:

DETAILED DESCRIPTION OF THE INVENTION

Figure 1:
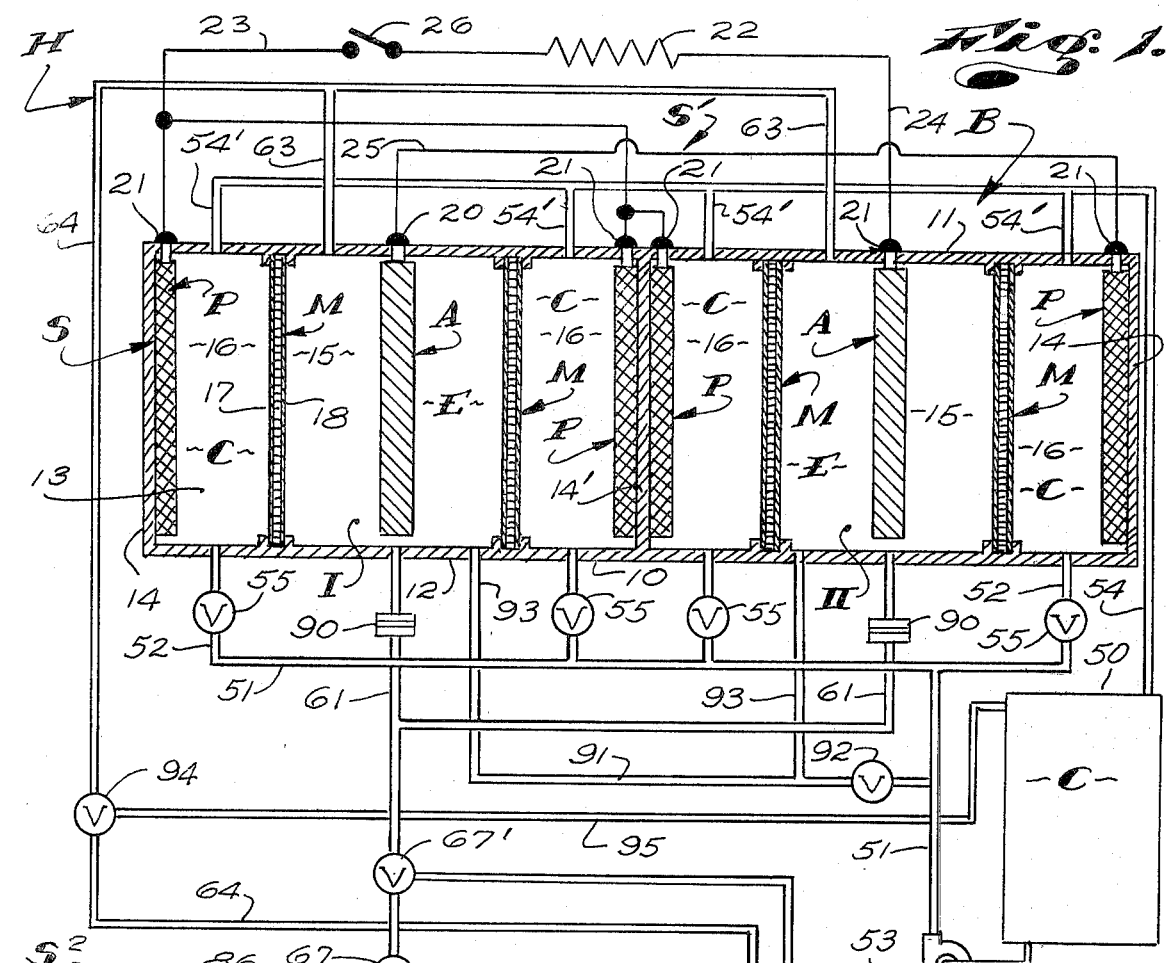
FIG. 1 is a diagrammatic view of a fuel cell and related support systems embodying the invention.

In FIG. 1 of the drawings, I have diagrammatically illustrated a battery B comprising two like cell structures S embodying my invention, a circuit S' connected therewith and a support system $S^2$ therefor.

The battery B is shown as including single elongate container 10 having flat, top and bottom walls 11 and 12, vertical side walls 13, vertical end walls 14, and an intermediate vertical partition 14', dividing the interior of the container into like left and right-hand chamber I and II. The partition 14' is, in essence, a common end wall for the adjacent chambers.

The container is established of a suitable dielectric material which is structurally and chemically stable in its intended environment.

It will be apparent and it is to be understood that the noted chambers can be defined by separate containers or that containers including more than two chambers can be provided, as desired or as circumstances require. Each chamber is a part of or contains a cell structure S. Each cell structure includes a pair of longitudinally spaced, flat, transversely extending vertical fluid barrier ion permeable membranes M, dividing the chamber of that cell into three separate compartments, there being a central anode compartment 15 and right and left-hand cathode compartments 16. The membranes M have longitudinally outwardly disposed cathode surfaces 17 spaced from and opposing their related end walls 14 and 14' and longitudinally spaced opposing surfaces 18 defining the opposite ends of the central anode compartment.

Each cell next includes a flat, transversely extending vertical anode plate A arranged freely within the compartment 15 in spaced relationship from and having oppositely disposed surfaces opposing the surfaces 18 of the membranes.

The plate A is provided with a terminal 20 which projects (upwardly) through a wall (top wall) of the container defining the chamber of or for the cell and which is accessible at the exterior of the container to connect with the circuit S'. The anode plate A is established of a suitable metal fuel and is such that it is consumed during operation of the cell. In the preferred carrying our of my invention, and in the example to be given, the anode plate is established of aluminum.

Since the plate or plates are consumed during operation of the cell or cells, it is necessary, for practical purposes, to provide cell structures embodying my invention with means to facilitate fast, easy and convenient insertion and removal of those plates, whereby new plates can be installed as and when old or previously installed plates have been consumed or reduced to an extent that their replacement is required. The structures and/or means that might be provided to effect replacement of the plates A in cells embodying my invention can vary widely in practice without departing from or affecting the broader aspects and spirit of my invention. Accordingly, I have elected not to burden this disclosure with detailed illustration and description of such means.

Each fuel cell structure S in the embodiment of my invention under consideration includes a pair of cathode electron distributor catalyst plates P. Each of the plates P is arranged within one of the cathode compartments of its related cell structure in spaced relationship from its related membrane M and each has a terminal 21 projecting (upwardly) through a wall (top wall) of the container defining the chamber of or for the cell structure and which is accessible at the exterior of the container to connect with the circuit S'.

Finally, each cell structure includes an electrolyte E of base material in aqueous solution in the anode compartment 15, about the anode plate A and in contact with the surfaces 18 of the membranes M and a cathode solution C, of acid compound in aqueous solution, in the compartments 16, between and contacting the surfaces 17 of the membranes M and the plates P.

The circuit S' shown in the drawings is a simple circuit comprising a resistance 22, representing a work-load. One end of the resistance or work-load is connected with the cathode terminals of the left-hand cell structure by lines 23 and 23'. The other end of the resistance is connected with the anode terminal 20 of the right-hand cell structure by a line 24. The cathode terminals 21 of the right-hand cell structure are connected with the anode terminal 20 of the left-hand cell structure by a line 25. With this basic and simple circuit, the two cell structures are series-connected and a closed circuit, through the two cell structures and the resistance is established.

An on and off switch 26 is provided in the line 23 to selectively close and open the circuit and to thereby put the cell structures into and out of operation.

The support system $S^2$ includes means to normally maintain the compartments 15 of the cell structures filled with electrolyte and to conduct the electrolyte into and out of the compartments 15 as circumstances require and to work on and maintain the electrolyte in proper chemical balance or condition. The means $S^2$ further serves to maintain a supply of cathode solution for the cells and to conduct that solution into and out of the compartments 16, as desired, and as circumstances require. The details of the support system $S^2$ will be considered in greater detail in the following.

In practice, the membranes M are such that they are effective barriers to the flow of liquids and thereby prevent the commingling of the electrolyte and cathode solutions, yet provide a wettable, ionically conductive, acid and base reactor interface between the electrolyte and cathode solutions.

In the conducting of many tests, I have found that a considerable number of commercially available membrane materials, if properly handled and/or prepared, can be used in carrying out my invention and that the spectrum of special membrane materials that might be employed is quite wide.

The effectiveness and efficiency of the invention is greatly affected by the ability of the membranes M to withstand the environment in which they are used and their ability to support the generation of hydroxyl ions at the acid-base reactor interface established therein.

Figure 2:
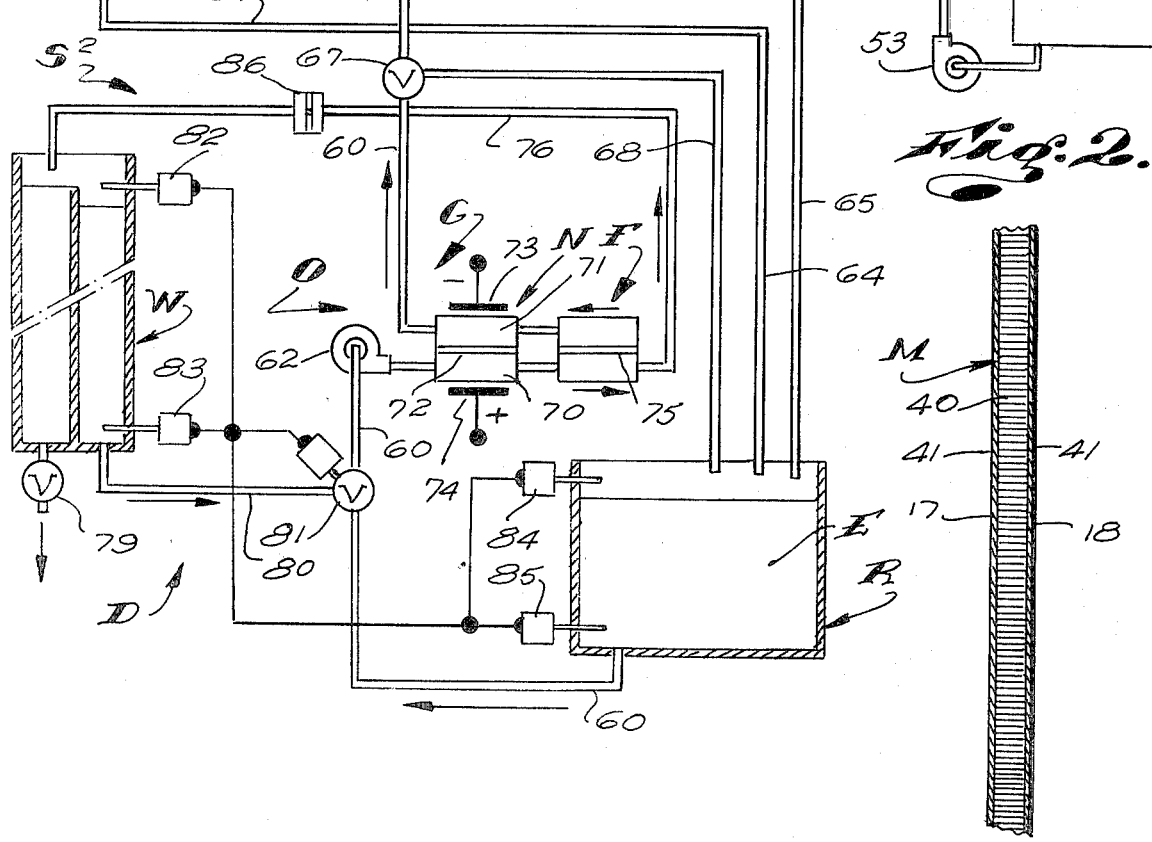
FIG. 2 is an isometric view of a portion of a membrane structure that I provide.

In one preferred carrying out of my invention, and as diagrammatically illustrated in FIG. 2 of the drawings, the membrane M includes a layer or sheet 40 of tough and durable high temperature aromatic polymer polysulfone or fluoro polymer with pore sizes from 0.01 to 0.1 microns. The sheet 40 is coated or protected by thin, porous layers or skins 41 of polypropylene with pores of from 5 to 10 microns.

In another form of membrane structure, the sheet 40 is established of perfluorosulfonic acid polymer, the polymer chains are intertwined at various points and wherein the sulfonic groups are clustered with associated cations. This membrane provides an impermeable barrier to prevent mixing of the acid and base solutions and enhance the operation of the cell. It is a wettable, permselective reactor.

In another form of membrane structure, the sheet 40 is established of a microporous polymer wherein the membrane pores are plugged with an ion-exchange resin, an acid gel-like coagulate, and/or a base gel-like coagulate.

The anode plates A can be made of a number of different metal fuels but are preferably aluminum, which metal is inexpensive; in abundant supply; light-weight; and is easy and convenient to handle and work with.

The electrolyte E is preferably an aqueous solution of sodium hydroxide.

In the preferred carrying out of my invention and in the example given, when the anode plates are aluminum, the corrosive reaction between the aluminum and the sodium hydroxide electrolyte is great and such that corrosion of the anode plates with resulting loss in efficiency of the cell structures will likely occur, if such corrosion is not suitably inhibited.

To effectively inhibit corrosion of the anode plates A in the electrolyte E, I add chromic acid ($H_2CrO_4$) to the electrolyte to adjust the PH of the electrolyte from 10 to 14. By so adjusting the PH of the electrolyte corrosion of the plates A during operation of the cells is inhibited and slowed to an extent that it poses no major problems. In point of fact, it has been found that adding the noted acid and establishing the PH of the electrolyte between 10 and 14 notably enhances the efficiency and power output of the cells. The adding of 0.06 M to 3 M of $H_2CrO_4$ to 6 M to 15 M NaOH has been found to establish a most efficiently balanced electrolyte for use in my cell structures.

The cathode fuel or solution C is preferably an aqueous acid compound fuel and is balanced so that the compound does not oxidize when oxygen is chemically combined with it (as when excessive fuel is present) and so that it does not form hydrogen gas (as when excess water is added to it).

In one preferred carrying out of my invention, and as an example, the solution C is an aqueous nitric acid solution consisting of approximately one-half $HNO_3$ and one-half $H_2O$.

The cathode distributor catalyst plates P in the compartments 16 and within the cathode solution C can be established of suitable porous metals, but is preferably established of porous high surface area carbon or an equivalent material, such as graphite. The plates P are such that they present a great number of active sites throughout the entire area of their surfaces which oppose the membranes M whereby the electrons added to the solution thereby are distributed and introduced into the solutions throughout the vertical crosssectional plane of the cell structures.

With the structure illustrated and thus far described, when the switch 26 of the circuit S' is closed (closing the circuit between the cathode terminals 21 of the left-hand cell structure and the anode terminal 20 of the right-hand cell structure), reaction in the cells commences and free electrons flow from the aluminum anode plates A to the several carbon distributor plates P of the cell structures.

The electrons flowing into the plates P and thence into the solution C react with the atoms of the elements of the solution and move to the membranes M where a reaction and the generating of hydroxyl ions takes place at the acid-base reactor interface. The hydroxyl ions thus generated move directly through the electrolyte E and toward the anode plates A. When the hydroxyl ions meet the surfaces of the plates A, they react with the atoms of the aluminum of which the plates are established and generate free electrons at the plate and a resulting flow of electric current into the circuit S', which current is utilized to perform work and to continue supplying the distributor plates P of the cell structures S with those free or added electrons required to sustain cell operation.

The foregoing brief explanation of the operation of my cell structure, while theoretically correct, does not take into account the fact that during continuous or protracted operation of the cell or cells, a by-product of the chemical reaction is produced. That by-product is a compound of $NaAl(OH)_4$ and if it is not removed from the electrolyte E, it will first adversely affect efficiency and operation of the cells and ultimately render the cells inoperative. The noted by-product is generated at a sufficiently rapid rate so that the cell structure or structures S, while theoretically operable, will not support sustained operation for sufficiently long or protracted periods of time to be practical and of real utilitarian value.

In furtherance of my invention, the support system $S^2$ that I provide operates to maintain the electrolyte E delivered to and in the anode compartments 15 of the cells substantially free of the noted by-product. The foregoing is accomplished by the provision of means for recirculating the electrolyte E through (into and out of) the cell compartments 15 and which works upon the by-product ladened electrolyte flowing from those compartments to remove the by-product, preparatory to re-introducing the electrolyte into said compartments.

The system $S^2$ includes cathode fuel circulating means to supply the compartments 16 with the solution C. The system $S^2$ includes a supply tank 50 with a delivery line 51 extending from it. The line 51 has branches 52 connected with the compartments 16. A pump 53 is engaged in line 51 and flow regulating valves 55 are engaged in the lines 52. The pump 53 operates to move the solution C through the compartments 16. The valves 55 control the rate of flow.

A return line 54 with branch lines 54' connected with the compartments 16 extends from the cells back to the tank 50 and cooperates with the lines 51 and 52 and pump 53 to maintain a continuous flow of solution through the compartments 16.

The support system $S^2$ next includes electrolyte recirculating means D to conduct the electrolyte E into and out of the compartments 15 of the cell structures and to work on the electrolyte to remove the noted by-product therefrom. The means D includes a reservoir R in which a supply of electrolyte is held. The means D next includes an electrolyte delivery system G to conduct electrolyte from the reservoir R to the compartments 15, and which includes an elongate delivery line 60 extending from the reservoir to the cell structures. The line 60 has branch lines 61 communicating with the bottoms of the compartments 15. The delivery system G next includes an electric pump 62 in the line 60 to move the electrolyte from the reservoir R through the lines 60 and 61 into the compartments 15.

The means D next includes electrolyte return means H to conduct electrolyte from the compartments 15 back to the reservoir R. The return means H includes lines 63 communicating with the tops of the compartments 15 and connected with a return line 64 extending to the reservoir R.

With the reservoir R and its related means, described above, it will be apparent that the electrolyte E can be made to flow continuously or intermittently into and out of the compartments 15, as desired or as circumstances require.

The means D, in addition to the foregoing, includes separator means O to separate the above noted by-product from the electrolyte E, before it is recirculated through the compartments 15. The means O operates or works on the by-product to convert it into regenerated sodium hydroxide (NaOH) and into aluminum trihydroxide. The regenerated sodium hydroxide is effectively retained and/or re-introduced into the electrolyte E and residual aluminum trihydroxide is separated from the electrolyte and delivered to waste.

The means O first includes a separator N arranged in the line 60 between the pump 62 and the valve 67. The separator N is an electro-mechanical device including a fluid conducting case divided into inlet and outlet compartments 70 and 71 by a membrane 72. The membrane 72 is more permeable to sodium ions ($Na^+$) than to the other components of the by-product contaminated electrolyte, $NaAl(OH)_4$. Further, the membrane 72 is permeable to positively charged ions (cations) and is impermeable to negatively charged ions (anions).

The compartment 70 is connected with an upstream section of the line 60 which conducts electrolyte (delivered by the pump 62) into the compartments 70 and across one surface of the membrane 72. The other compartment 71 is filled with the electrolyte solution (NaOH), which contacts the other surface of the membrane and which flows from that compartment through a downwstream section of the line 60 for delivery to the compartments 15.

The solution in the compartment 71 receives the sodium ions ($Na^+$) that move through the membrane 72. This ion movement is induced by an electric potential established across the membrane by the arrangement of suitable electrodes 73 and 74 at opposite sides of the case and at opposite sides of the membrane 72. The solution from which the sodium ions have been caused to move flows from the compartment 70 into a cross-flow filter F which has a microporous filter element 75 through which most of the water and the low molecular weight solids (NaOH) move or pass. Those passed materials are conducted from the filter F back into the compartment 71 of the separator N as a filtrate solution (dilute NaOH aqueous solution) into which the positively charged sodium ions moving through the membrane 72 of the separator N combine to reestablish the electrolyte E, in an uncontaminated balanced condition.

The fluid shear of cross-flow against the micro porous filter element 75 tends to sweep away accumulated particles of $Al(OH)_3$ suspended in water and are conducted out of the filter F into and through a line 76 to a settling tank W where the noted by-product $Al(OH)_3$ or aluminum trihydroxide settles from the water. The by-product is periodically drained from the tank W through a valve controlled drain line 79 and is suitably disposed of.

The water collected by the settling tank W is intermittently re-introduced into the electrolyte through a line 80 extending from the tank W to a two-way valve 81 in the line 60 upstream of the pump 62 (or into the reservoir R.) The valve 81 is preferably an electric (solenoid operated) valve and is under control of a pair of vertically spaced liquid level sensors 82 and 83 in the tank W, substantially as indicated in the drawings.

In addition to the sensors 82 and 83, a pair of vertically spaced liquid level sensors 84 and 85 can be placed in the reservoir R to effect opening and closing of the valve 81 when the liquid level in the reservoir is low and the addition of water to the supply of electrolyte is required.

With the means O, it will be apparent that little or no appreciable amount of sodium hydroxide is spent or lost in normal operation of the cells and that the balance or strength of the electrolyte E in the cell compartments 15 is maintained substantially constant.

In practice, an adjustable flow restrictor 86 can be provided in the line 76 to establish a desired back pressure in the system and an effective pressure differential across the element 75 of the filter F.

Figure 3:
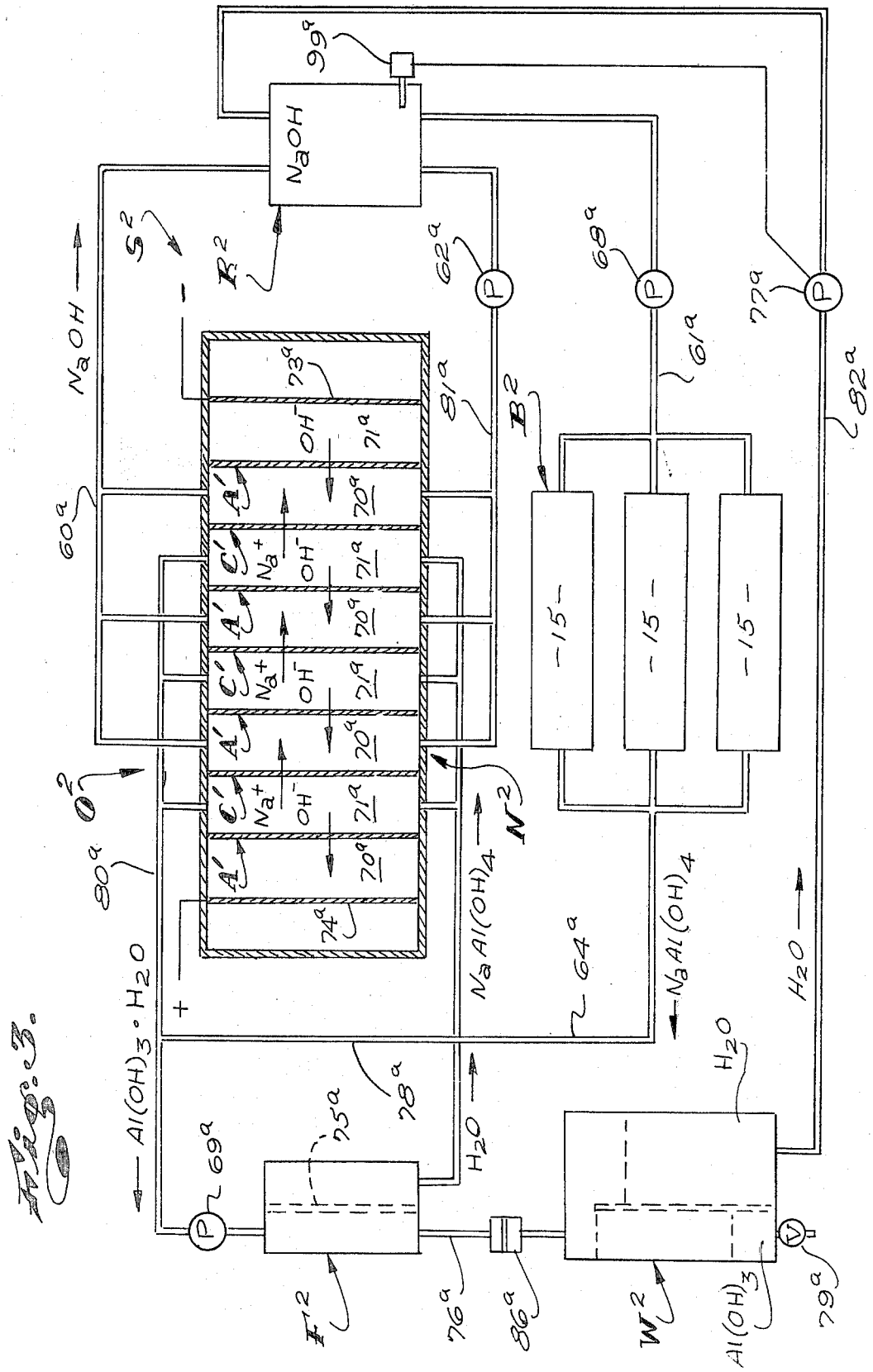
FIG. 3 is a diagrammatic view of another form of support system.

In FIG. 3 of the drawings, I have diagrammatically illustrated another form of support system $S^2$. Referring to FIG. 3 of the drawings, the system $S^2$ includes separator means $O^2$ to separate the by-product (aluminum trihydroxide) from the electrolyte before it is reintroduced into the compartments 15 of the cells supported by the system. The means $O^2$ operates to convert the aluminum trihydroxide $Al(OH_3)$) into sodium hydroxide (NaOH). The regenerated sodium hydroxide is re-introduced into the electrolyte and residual aluminum trihydroxide is separated from the electrolyte and delivered to waste.

The means $O^2$ first includes a demineralization concentration ion exchange membrane electrolysis system $N^2$ connected with lines $60^a$, $78^a$, $80^a$ and $81^a$ and between pumps $62^a$ and $69^a$, a filter $F^2$ and a reservoir $R^2$, as shown in FIG. 3 of the drawings.

The electrodialysis system $N^2$ is an electromechanical device including a fluid conducting case divided into compartments $70^a$ and $71^a$ by membranes A' and C'. The membranes are arranged in pairs consisting of cation permeable and anion permeable membranes placed alternatively between a positive electrode $E^+$ located at one end of the stack of membranes and a negative electrode $E^-$ located at the other or opposite end of the stack of membranes. When DC voltage is applied to the above assembly alternating membrane compartment $70^a$ and $71^a$ become ion-gaining (concentrating) and ion-losing (demineralization) compartments. The by-product contaminated electrolyte is fed into the compartments $71^a$. Sodium cations ($Na^+$) migrate toward the cathode $E^-$ through the cation-permeable membranes C and are stopped by the anion-permeable membranes A. The hydroxyl ions ($OH^-$) migrate through the anion-permeable membranes A and are stopped by the cation-permable membranes C.

The solution in the compartments $70^a$ receives the sodium ions and the hydroxyl ions, thus the sodium and hydroxyl ions combine to form sodium hydroxide. That solution is caused to recirculate through the compartments $70^a$ and the reservoir $R^2$, through lines $60^a$ and $81^a$ by means of the pump $62^a$.

The solution recirculating through the compartments $71^a$ has residual solids of aluminum trihydroxide suspended in water. These solids are conducted out of the compartments $71^a$ (with water) through the line $80^a$ by means of the pump $69^a$ and is delivered to and through filter $F^2$ and thence through line $76^a$ (in which an adjustable flow regulator $86^a$ is arranged) to a settling tank $W^2$ in which the aluminum trihydroxide is settled from the water and collected.

The filter $F^2$ is a cross-flow filter and includes a microporous filter element $75^a$ through which most of the water and the contaminated electrolyte moves. The electrolyte flowing from the filter flows through line $78^a$ and is introduced and caused to recirculate through the compartments $71^a$ of the separator means $N^2$, as noted above.

Separated or clear water in the tank W is pumped therefrom through line $82^a$ and to the reservoir $R^2$ by means of pump $77^a$.

The by-product aluminum trihydroxide is periodically removed from the tank $W^a$ through a valve $79^a$ and is suitably disposed of.

The electrolyte in the reservoir $R^2$ is delivered to the anode compartments 15 of the related cells $B^2$ by means of pump $68^a$, through lines $61^a$. Used or contaminated electrolyte flowing from the compartments 15 of the cells is conducted through lines $64^a$ to line $80^a$, downstream of the pump $69^a$ and is delivered to the filter $F^2$ and thence into and through the system $N^2$ to be worked upon in the manner described above.

The PH of the electrolyte in the reservoir $R^2$ is monitored by a sensory system $99^a$, which system is connected with the pump $77^a$ and operates to transfer water from the tank $W^2$ to the reservoir and to thereby maintain the electrolyte in desired dilute solution.

Referred again to FIG. 1 where two or more cell structures are arranged or connected in series and share common electrolyte solution, shunt current (hydroxyl ions) will (if not checked) flow out of each cell and through the several cathode electrolyte solution flow lines communicating with the compartments 15 of the cells and will eventually reach the other cell or cells. Such flow of shunt current (hydroxyl ions) (if not checked) will materially adversely affect and cut down the effectiveness and efficiency of the cell structures.

As shown in FIG. 1 of the drawings, the flow of shunt current is effectively eliminated by the arrangement of an ion filter 90 arranged in each solution conducting line 61 which enters. In practice, the ion filters 90 include fluid conducting containers engaged in their fluid conducting lines and in which suitable filter packs are arranged. The filter packs are fluid permeable but impermeable to hydroxyl ions. One material suitable for establishing the filter packs in the filters 90 is a granule structure of perflurosulfonic acid polymer. Another material suitable for establishing such filter packs is a strong acid cation ion-exchange column of styrene-DVB spherical beads of the $Na^+$ ionic form which, while permeable to liquids, is impermeable to hydroxyl ions.

In practice, when the cell structures S are put out of service or shut down for protracted periods of time, the anodes will corrode, if left immersed in the base electrolyte E. If such corrosion is let to progress to any appreciable extent, the surfaces of the plates A will become coated with insulative oxides which will materially adversely affect the efficiency of the cells when they are put back into service.

In carrying out my invention, and to eliminate corrosion of the anode plates A, when the cells are put out of service and into storage, I provide a delivery line 91 with a valve 92 extending from the supply tank 50 and having branch lines 93 extending to and communicating with the compartments 15 of the cell structures S. With the foregoing means, by operating the valve 67 of the means D to shut off the flow of electrolyte to the cells and bypass it through line 68 into the reservoir R and leaving valve 94 open to line 64 and valve 67' open to line 65, the electrolyte in the cell compartments 15 can be conveniently drained from the compartments into the reservoir R. Thereafter, upon closing the valve 94 in line 64, the valve 92 in the line 91 can be opened and the compartments 15 can be filled with the acid cathode solution. Thus, the anode plates A are immersed in the acid cathode solution C when the construction is in its shut down condition and the anode plates A are maintained clean, bright and free of corrosive oxides.

When the "stored" cells are to be put back into operation, the cathode solution C is drained back into the tank 50 (as by lowering the tank), and the valve 92 is closed. Thereafter, the valves 67 and 94 are opened to reestablish normal operating flow of electrolyte into and out of the compartments 15, thereby putting the cells back into their operating condition.

Referring once again to the membranes M, when the cell compartments 15 and 16 are filled with the electrolyte E and cathode solution C, and said solutions contact and penetrate the membrane structures noted in the preceding, a reaction occurs which causes the formation of hydroxyl ions at the acid-base reactor interface of the membrane.

In addition to the foregoing, the cathode C, which is an acid compound is provided with a suitable carbon catalyst which catalyst can be and is most economically and effectively incorporated in and/or made a part of the distributor plates P. The catalyst material (carbon) of which the plates P are established is in that form where the maximum potential surface area and maximum potential number of sites that it can present, are presented.

The cost of the carbon catalyst used does not become a significant economical factor.

With the integrated ion catalyst high surface area electron distributor plates P in the compartments 16 of the cell structures S, electrons introduced into the solution C are distributed throughout the surface of those plates assuring maximum potential catalyzing effectiveness and efficiency and result in extraordinarily effective and efficient operation of the cells.

It is understood and believed that hydroxyl ions will not move through an acid solution. Accordingly, since the reaction in or at the cathode sections of my cell structures generate hydroxyl ions, the chemical reaction which generates the hydroxyl ions takes place at the acid-base reaction interface of the membranes M. Depending upon the nature of the membrane material and by selecting appropriate materials, the reaction interface can be made to occur at the cathode compartment sides of the membranes or can and is preferably made to occur at the electrolyte or anodic sides of the membranes.

In practice, the half reaction and half potential volts attained by different acid compound cathode fuels in my new cell structures, and the resulting effectiveness and efficiency of those cell structures can vary widely depending upon the particular fuels that are used.

The following are the chemical reactions of two classes of metal/acid fuels that I have found to be particularly effective in carrying out my invention:

ALUMINUM/PHOSPHORIC ACID FUELS

Anode: $2Al + 8OH^- = Al_2O_3.3H_2O + 2OH^- + 6e^-$
Cathode: $3H_3PO_4 + 3H_2O + 6e^- = 3H_3PO_3 + 6OH^-$
Cell: $2Al + 3H_3PO_4 + 3H_2O = Al_2O_3.3H_2O + 3H_3PO_3$

ALUMINUM/SULFURIC ACID FUELS

Anode: $2Al + 8OH^- = Al_2O_3.3H_2O + 2OH^- + 6e^-$
Cathode: $3H_2SO_4 + 3H_2O + 6e^- = 3H_2SO_3 + 6OH^-$
Cell: $2Al + 3H_2SO_4 + 3H_2O = Al_2O_3.3H_2O + 3H_2SO_3$ Having described my invention, I do not wish to be limited to the specific details herein set forth, but wish to reserve to myself any modifications and/or variations that may appear to those skilled in the art and which fall within the scope of the following claims:

Having described my invention, I claim:

1. A fuel cell comprising an elongate container, a pair of flat, vertical, longitudinally spaced ion permeable fluid barrier membranes in the container and defining a central anode compartment and longitudinally spaced cathode compartments at the opposite ends of the anode compartment, a flat, vertical anode plate of metal fuel in the anode compartment in spaced parallel relationship with and between membranes, a flat, vertical electron distributor catalyst plate in each cathode compartment in spaced parallel relationship from the membrane of that compartment, a base electrolyte solution in the anode compartment, an acid cathode solution in the cathode compartments and electric circuit means connected with the anode plate to conduct electrons from that plate and connected with the electron distributor catalyst plates to conduct electrons to those plates for distribution and introduction into the cathode solution.

2. The fuel cell set forth in claim 1 wherein the cathode solution is a compound of nitric acid and water.

3. The fuel set forth in claim 2 wherein the electrolyte is a sodium hydroxide solution.

4. The fuel set forth in claim 3 wherein the anode plate is aluminum.

5. The fuel cell set forth in claim 4 wherein the electron distributor catalyst plates are porous carbon plates.

6. The fuel cell set forth in claims 1, 2, 3, 4 or 5 wherein the membranes are cation, wettable, perselective reactors of perfluorsulfonic acid polymer.

7. The fuel cell set forth in claims 1, 2, 3, 4 or 5 wherein the membranes are established of porous polysulfone polymer which establishes a wettable acid-base reactor interfaces between the cathode and electrolyte solutions.

8. The fuel cell set forth in claims 1, 2, 3, 4 or 5 wherein the membranes are established of porous fluoropolymer which establish wettable acid-base reactor interfaces between the cathode and electrolyte solutions.

9. The fuel cell set forth in claims 1, 2, 3, 4 or 5 wherein the membranes are established of a porous fluoropolymer, the pores of which are filled with particles of acid ion-exchange resin and establish wettable acid-base reactor interfaces between the cathode and electrolyte solutions.

10. The fuel cell set forth in claims 1, 2, 3, 4 or 5 wherein the membranes are established of a porous fluoropolymer, the pores of which are filled with particles of base ion-exchange resin and establish wettable acid-base reactor interfaces between the cathode and electrolyte solutions.

11. The fuel cell set forth in claims 1, 2, 3, 4 or 5 wherein the membranes are established of porous fluoropolymer, the pores of which are filled with an acid coagulate established of of the acid and base solutions.

12. The fuel cell set forth in claims 1, 2, 3, 4 or 5 wherein the membranes are established of porous fluorpolymer, the pores of which are filled with a base coagulate established of reaction of the acid and base solutions.

13. The fuel cell set forth in claims 1, 2, 3, 4, 5, 6, 7, 8, 9, 10, 11 or 12 which further includes a cathode solution supply tank remote from the cell, cathode solution conducting means between the supply tank and the cathode compartments to feed cathode solution into those compartments, an electrolyte reservoir remote from the cell and electrolyte solution conducting means between the reservoir and the anode compartment to conduct electrolyte solution into and out of that compartment and including separator means to remove by-products of chemical reaction occurring in the cell from said electrolyte solution conducted out of the cell, preparatory to conducting the electrolyte back into the cell.

14. The fuel cell set forth in claims 1, 2, 3, 4, 5, 6, 7, 8, 9, 10, 11 or 12 which further includes a cathode solution supply tank remote from the cell, cathode solution conducting means between the supply tank and the cathode compartments to feed cathode solution into those compartments, an electrolyte reservoir remote from the cell and electrolyte solution conducting means between the reservoir and the anode compartment to conduct electrolyte solution into and out of that compartment and including separator means to remove by-products of chemical reaction occurring in the cell from said electrolyte solution conducted out of the cell, preparatory to conducting the electrolyte back into the cell, said electrolyte solution conducting means operates to remove electrolyte from the anode compartment to put the cell in inoperative storage condition and said cathode solution conducting means operates to fill the anode compartment with the acid cathode solution when the cell is in storage condition.

* * * * *